(12) United States Patent
Demeocq

(10) Patent No.: US 6,942,382 B2
(45) Date of Patent: Sep. 13, 2005

(54) MINIATURE CONNECTOR WITH ON-BOARD ELECTRONICS FOR A THERMOCOUPLE

(75) Inventor: Etienne Demeocq, 43 bis, rue des Tailles, 58000 Nevers (FR)

(73) Assignee: Etienne Demeocq, Magney-Cours (FR)

( * ) Notice: Subject to any disclaimer, the term of this patent is extended or adjusted under 35 U.S.C. 154(b) by 0 days.

(21) Appl. No.: 10/629,084

(22) Filed: Jul. 29, 2003

(65) Prior Publication Data

US 2004/0058588 A1 Mar. 25, 2004

(51) Int. Cl.$^7$ .............................. G01K 7/02; G01K 1/14; H01R 13/00
(52) U.S. Cl. ...................... 374/179; 374/208; 439/329
(58) Field of Search ............................... 374/208, 179, 374/183; 439/329

(56) References Cited

U.S. PATENT DOCUMENTS

| | | | | |
|---|---|---|---|---|
| 3,650,154 A | * | 3/1972 | Arnett et al. | 374/181 |
| 4,133,700 A | | 1/1979 | Hollander et al. | 73/361 |
| RE30,735 E | * | 9/1981 | Ihlenfeldt et al. | 374/181 |
| 4,488,824 A | | 12/1984 | Salem | 374/181 |
| 4,588,308 A | | 5/1986 | Saito | 374/181 |
| 4,669,049 A | * | 5/1987 | Kosednar et al. | 702/133 |
| 4,718,777 A | * | 1/1988 | Mydynski et al. | 374/181 |
| 4,776,706 A | * | 10/1988 | Loiterman et al. | 374/208 |
| 4,863,283 A | * | 9/1989 | Falk | 374/181 |
| 5,070,732 A | * | 12/1991 | Duncan et al. | 73/431 |
| 5,088,835 A | * | 2/1992 | Shigezawa et al. | 374/181 |
| 5,351,551 A | * | 10/1994 | Drubetsky et al. | 73/755 |
| 5,735,605 A | * | 4/1998 | Blalock | 374/179 |
| 6,068,400 A | * | 5/2000 | Nelson et al. | 374/179 |
| 6,074,089 A | * | 6/2000 | Hollander et al. | 374/181 |
| 6,183,131 B1 | * | 2/2001 | Holloway et al. | 374/172 |
| 6,210,036 B1 | * | 4/2001 | Eberle et al. | 374/141 |

FOREIGN PATENT DOCUMENTS

FR 2762908 11/1998

OTHER PUBLICATIONS

"A Smart Voltage Processor for Thermocouples", Khadouri et al., Proceedings 1996 National Sensor Conference, Delft, The Netherlands, Mar. 20–21, 1996. (pp. 125–130).

* cited by examiner

Primary Examiner—Gail Verbitsky
(74) Attorney, Agent, or Firm—Perman & Green, LLP

(57) ABSTRACT

The present invention relates to a miniature connector with on-board electronics for a thermocouple, characterized in that it incorporates:

two connection means (20, 21) for connecting a thermocouple (1) to a printed circuit (4) connecting the elements of the on-board electronics;

three connection posts (230, 231, 232) from the printed circuits (4) to a connector supply and signal transfer cable (3) formed by the on-board electronics;

means (24) for measuring the ambient temperature in the connector disposed between the two connection means (20, 21) of the thermocouple;

means (25, 26, 27, 29) for amplifying the signal supplied by the thermocouple (1) and scaling of the signal supplied by the ambient temperature measurement means (24), these means (25, 26, 27, 29) also performing the summation of these two signals as well as the linearization of the signal resulting from this summation.

9 Claims, 2 Drawing Sheets

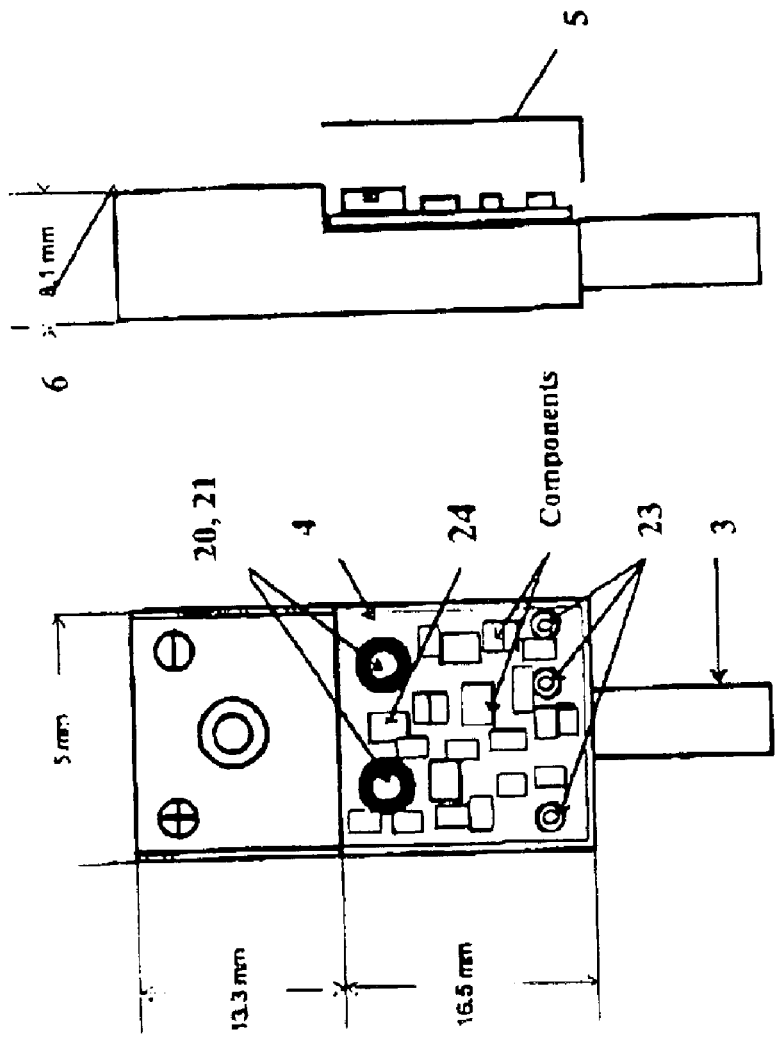

MINIATURE CONNECTOR WITH ON-BOARD ELECTRONICS FOR A THERMOCOUPLE

The present Invention relates to a miniature connector with on-board electronics for a thermocouple.

Thermocouple systems are known such as, for example, the U.S. Pat. No. 4,448,824 patent, that incorporate a thermocouple system whose signals are sent via an amplifier. These signals are combined with an ambient temperature indication signal provided by a Zener diode; the resulting signal is then sent to a display. However, these models do not make it possible to recognize the distribution of the different elements and require the assembly of a semi-conductor couple to a thermionic inertia element comprised of two bodies of the same metal conductor disposed opposingly and separated by a thin layer of electrically insulating but thermally conducting material Such a cold junction compensation system is complex to manufacture and can be difficult to integrate into a miniature conductor. In general, amplification and measurement processing circuits are remote from the thermocouple itself.

A connector module for a thermocouple comprising two connection means. (10) for one such thermocouple with protection against stray electromagnetic signals and two means for output connection is also known from French patent application 2 762 908. The module incorporates a battery power supply and an output amplifier carrying out the summation of the signal provided by the thermocouple amplifier, the local temperature sensor and a correction voltage, as it is represented in FIG. 3 of this document. In addition, this device requires adjusting potentiometers, which involves difficult debugging and the possibility of maladjustment of the potentiometers during use. Furthermore, the size of the module is heavier, because the device incorporates, for its self-contained power supply, a lithium battery, a switch, a charge pump and a microprocessor for controlling the set of different elements as well as an LED-illuminated display system.

Such a device is consequently larger, more complex to manufacture and more difficult to control.

Another device is taught by the U.S. Pat. No. 4,133,700 patent and comprises a connector having smaller dimensions than the aforementioned one; this connector for a thermocouple being self-powered and functioning on the principle of a Wheatstone bridge incorporating thermistors in its arms for locally measuring temperature and performing cold-junction compensation relative to the signal provided by the thermocouple. However, such a device does not comprise the means for assuring the processing and amplification of the signal prior to its being sent to the measurement means, which could generate erroneous results due to detection error as a consequence of insufficient amplification. In addition, the device, as in the case of the aforementioned one, being self-powered, the absence of measurement could also result from depletion of the power source.

The object of the invention is thus to provide an amplification connection device for a thermocouple having very small dimensions and integrating a plurality of electronic functions, making possible its power supply by the cable receiving the measurements from the thermocouple, in order to arrange the measurement processing system at an adequate distance therefrom.

This object is achieved by the fact that the miniature connector with on-board electronics for a thermocouple is characterized in that it is comprised of a module containing:

two means for connecting a thermocouple to a printed circuit connecting the elements of the on-board electronics;

three printed circuit terminal posts to a supply cable of the connector and signal transfer, formed by the on-board electronics;

means for measuring the ambient temperature in the connector arranged between the two connection means of the thermocouple;

means for amplifying the signal supplied by the thermocouple and scaling of the delivered signal by the means for measuring the ambient temperature; these means also carrying out the summation of the two signals as well as the linearization of the signal resulting from said summation;

According to another feature, the configuration means are comprised of a very low offset-value and very low drift differential amplifier means, each of whose inputs is connected to the first and second connection means and whose output is connected via the printed circuit to an input of a summation circuit receiving at its other input the output of a circuit for scaling of the signal delivered by the output of the ambient temperature sensor, the output of said summation circuit being connected to the input of a linearization circuit whose output is connected to one of the cable connection means.

According to another feature, a second cable connection means is connected to a voltage regulator that supplies power via its printed circuit board tracks to the on-board circuits in the connector.

According to another feature, the length of the module is less than 30 mm, its breadth less than 20 mm and its thickness less than 10 mm.

According to another feather, the K-type thermocouple is comprised of a chromel alloy wire connected to an alumel alloy wire to comprise a hot junction, the connection of these two wires, respectively, to the first and second connection means with the copper of the printed circuit comprises a cold junction.

Other features and advantages of the present invention will become more apparent when reading the following description with reference to the appended drawings, wherein:

FIG. 2a represents a top view of the miniature connector according to the invention, the cover removed:

FIG. 2b represents a side view of the miniature connector with its cover.

Figure 1:
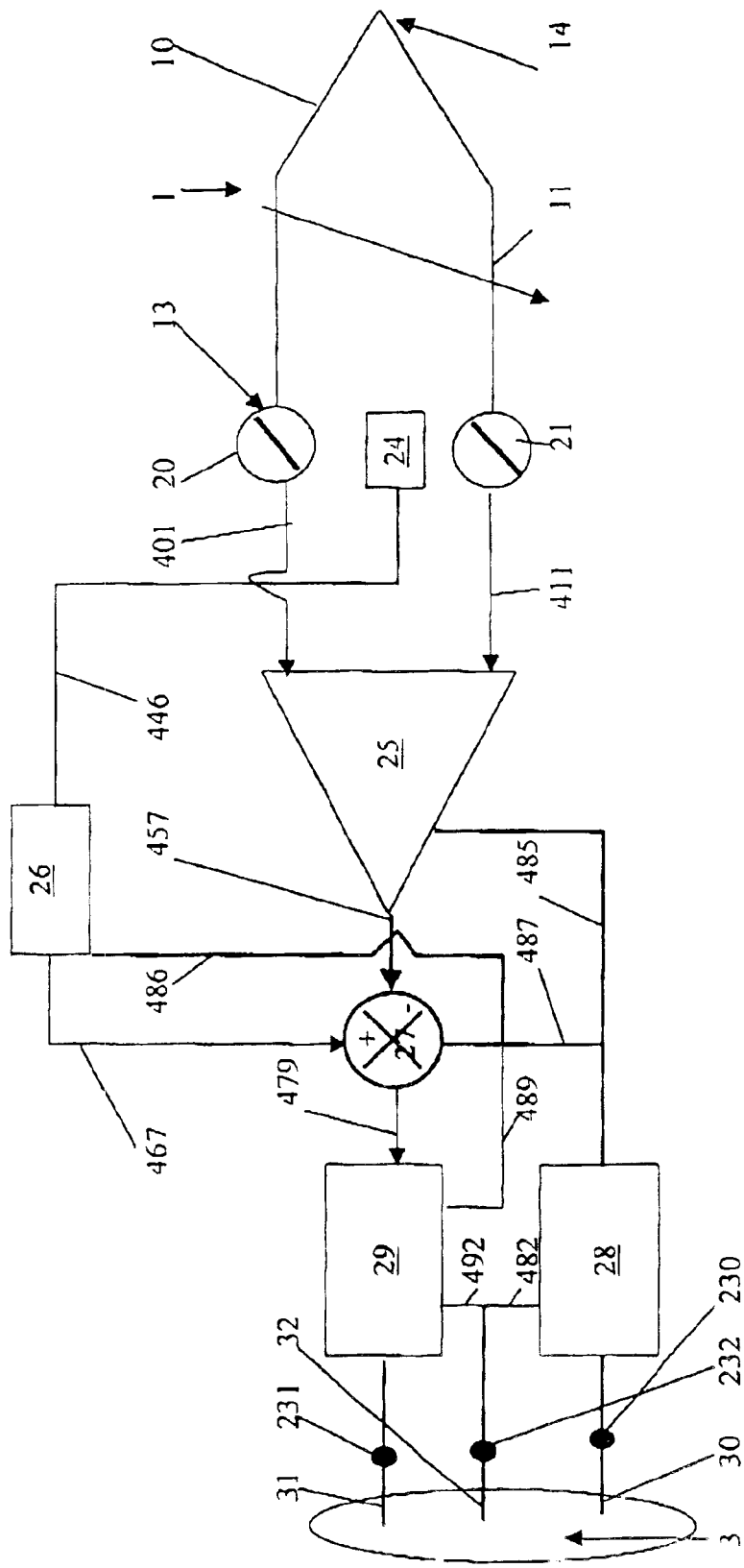
FIG. 1 represents a diagram of the circuits implanted in the connector according to the invention.

The present invention will be described with reference to FIGS. 1, 2a and 2b. The invention is described relative to a utilization using one K-type thermocouple, but it can be used with any type of thermocouple. The miniature connector, represented in FIG. 2a and FIG. 2b, is incorporated into a module (6), wherein a fixed cover (5) is affixed on top of the electronic components and the printed circuit (4). The printed circuit (4) establishes the connections between the electronic components and the connection means (20, 21, 23) according to the wiring diagram represented in FIG. 1. The K-type thermocouple, for example, is comprised of a chromel alloy wire (10) and an alumel alloy wire (11) connected together at one end using a soldering called a "hot junction" (14). This hot junction (14) is placed at the point where the temperature is to be measured. The two wires (10, 11) are connected separately to the other end in a miniature male connector. This male connector engages in the respective female connector (21, 20), affixed to the printed circuit. These two connectors are not represented on the block diagram in FIG. 1, because the metals used in these connectors are identical to those of the thermocouple and it occurs as if the chromel alloy wires and the alumel alloy wires were directly connected, respectively, to the first (20) and the second (21) connection means. These two connections chromel copper then copper—alumel that connect the thermocouple to the copper tracks of the printed circuit form what is called the "cold junction." The tracks (401, 411) of the printed circuit connect the connection means (20, 21) to a differential amplifier (25), supplied by a connection track (485) to a voltage supply and control circuit (28) received on the two wires (30, 32) of the cable (3) by a first and second connection post (230, 232); the second connection post (232) constituting the earthing that is connected to the different circuits by the tracks (482, 492). A ambient temperature sensor circuit (24) is disposed between the first and second connection means (20, 21) of the thermocouple (1); said sensor circuit makes it possible to measure the temperature existing at the level of the connector, this sensor sending a signal over the track (446) to a scaling circuit (26), which sends via the track (467) the processed signal to a summer circuit (27) receiving over another input the output of a differential amplifier (25) via the track (457). The output of the summer circuit is sent via the track (479) over a linearization circuit (29) of the signal generated by the thermocouple and the cold junction compensator. This linearization circuit (29) delivers a signal, which is sent via the wire (31) of the cable (3), via a third connection post (231) to a measurement device at a distance from the miniature connector. The scale adaptation circuit (26) makes it possible to place the signal coming from the sensor and the amplified thermocouple signal on the same scale by following the best thermocouple gradient in the ambient temperature range of utilization of the connector. This makes possible working in an ambient temperature of from 0° to 100° without degradation of the characteristics of the signals supplied by the connector and thus makes possible placing the connector close to the temperature measurement. The linearization circuit (29) is an multiple conductance analog circuit making it possible to correct, for example, the negative temperature using a K-type thermocouple comprised of chromel and alumel.

As the so-called hot junction of the thermocouple is for measuring the temperature by generating an electromotive force (EMF) at the Junction of the different conductor materials and that this voltage is very low, it is important to be able to amplify it from the start. In addition, the amplifier being placed in proximity to the measurement position, it is important to know, by a measurement of the ambient temperature, the temperature of the cold junction (13) of the thermocouple, because the measured temperature is the difference between the temperature at the end of the probe (14) and the ambient temperature at the cold junction (13). By including the temperature sensor (24) as close as possible to the cold junction, it is possible, by adding the ambient temperature to the measured temperature, to have a more precise compensation of the temperature of the cold junction. The connector developed in this fashion also makes it possible to create the junction with a measurement apparatus by ordinary three-strand cable, without requiring a special connection. The temperature sensor (24) can be of adequate precision and measure the ambient temperature at the level of the screws (20, 21) that connect the tabs of the thermocouple connector to the copper of the printed circuit (4). The scaling circuit (26) makes it possible to adapt the measurement done to the signal provided by the thermocouple without have to resort to the use of potentiometry. Finally, the voltage regulator circuit (28) provides a voltage supply of the different connector circuits in a voltage range of from 5 V and 16 V.

The components necessary to the protection against stray electromagnetic forces are also incorporated into the connector and are comprised of ferrites placed on the wires (231 and 230) and ceramic capacitors between these same wires and the earthing (232). The circuit realized in this manner is housed in a miniature connector module whose maximum length is less than 30 mm, the breadth is less than 20 mm and the thickness is less than 10 mm.

The components used are the "LINEAR TECHOLOGY" LTC 2050 amplifier and the resistors having a 0.1% precision and 10 ppm conductance of the "MEGGIT" RN73F1J series RN73F1J.

It should be obvious to the person skilled in the art, that the present invention makes possible embodiments in many other specific forms without departing from the field of application of the invention as claimed. Consequently, these present embodiments must be considered to be illustrative but capable of modification within the field defined by the scope of the annexed claims and the invention is not limited to the specifics recited hereinbefore.

What is claimed is:

1. A miniature connector having on-board electronics for a thermocouple, characterized in that it comprises a module containing:
    first and second connection means for connecting a thermocouple to a printed circuit, said printed circuit including connecting means for connecting elements of the on-board electronics;
    three connection posts for connecting said printed circuit to a connector supply and signal transfer cable, said signal being formed by the on-board electronics;
    means for measuring the ambient temperature in the connector disposed between the two connection means of the thermocouple;
    forming means for amplifying a signal supplied by the thermocouple and scaling of a signal supplied by the ambient temperature measurement means, the forming means also performing the summation of the amplified signal and the scaled signal as well as the linearization of the signal resulting from this summation;
    said forming means being comprised of:
        a linearization circuit, whose output is connected to one of said three connection posts;
        a scaling circuit of the signal supplied by an output of the ambient temperature measurement means;
        a summation circuit comprising two inputs and one output;
        a differential amplifier circuit, each of whose inputs is connected to the first and second connection means and whose output is connected via a printed circuit track to a first input of the summation circuit, said summation circuit receiving over its other input the output of said scaling circuit, the output of the summation circuit being connected to the input of said linearization circuit.

2. The connector according to claim 1, characterized in that the differential amplifier circuit of the forming means comprises a very low offset and very low drift differential amplifier.

3. The connecter according to claim 1, characterized in that a cable connection post of the three connection posts is connected to a voltage regulator that supplies the on-board electronics in the connector via the printed circuit track.

4. The connector according to claim 1, characterized in that the module has a length of less than 30 mm, a breadth of less than 20 mm and a thickness of less than 10 mm.

5. The connector according to claim 1, characterized in that the K-type thermocouple is comprised of a chromel alloy wire connected to an alumel alloy wire for comprising a hot junction; the connection of these two wires, respectively, to the first and second connection means with the copper of the printed circuit comprises a cold junction.

6. A miniature connector having on-board electronics for a thermocouple, characterized in that the connector comprises a module containing:

first and second connection means for connecting the thermocouple to a printed circuit, the printed circuit including connecting means for connecting elements of the on-board electronics;

three connection posts for connecting the printed circuit to a connector supply and signal transfer cable and coupling a signal being formed by the on-board electronics;

means for measuring the ambient temperature in the connector disposed between the first and second connection means of the thermocouple;

forming means for amplifying a signal supplied by the thermocouple and scaling of a signal supplied by the ambient temperature measurement means, the forming means also performing a summation of the amplified signal and the scaled signal as well as a linearization of a signal resulting from the summation;

the forming means being comprised of:

a linearization circuit whose output is connected to one of the three connection posts;

a scaling circuit for scaling a signal supplied by an output of the ambient temperature measurement means;

a summation circuit comprising two inputs and one output;

a differential amplifier circuit, having at least one input that is connected to the first and second connection means and an output that is connected via a printed circuit track to a first input of the summation circuit, the summation circuit receiving over one of the at least one input the output of the scaling circuit, the output of the summation circuit being connected to an input of the linearization circuit.

7. The connector according to claim 6, wherein one of the three connection posts is connected to a voltage regulator that supplies each circuit of the forming means contained in the connecter via respective tracks.

8. The connector according to claim 6, wherein the module has a length of less than 30 mm, a breadth of less than 20 mm and a thickness of less than 10 mm.

9. The connector according to claim 6, wherein the thermocouple is a K-type thermocouple comprised of a chromel alloy wire connected to an alumel alloy wire for comprising a hot junction and a connection of these two wires, respectively, to the first and second connection means with a copper of the printed circuit comprises a cold junction.

* * * * *